Figure 1:
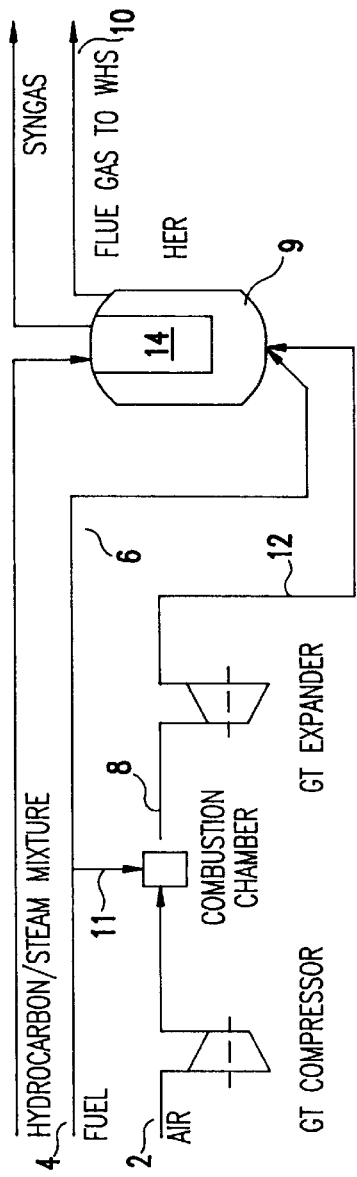

United States Patent

Holm-Larsen et al.

Patent Number: 5,937,631
Date of Patent: Aug. 17, 1999

[54] METHOD FOR COMBINED GENERATION OF SYNTHESIS GAS AND POWER

[75] Inventors: Helge Holm-Larsen, Værløse; Bodil Voss, Virum, both of Denmark

[73] Assignee: Haldor Topsoe A/S, Lyngby, Denmark

[21] Appl. No.: 08/878,618

[22] Filed: Jun. 19, 1997

Related U.S. Application Data

[60] Provisional application No. 60/020,238, Jun. 21, 1996.

[51] Int. Cl.[6] .................................................. F02C 6/00
[52] U.S. Cl. ............................... 60/39.02; 60/39.12
[58] Field of Search ............................ 60/39.02, 39.05, 60/39.12, 39.465

[56] References Cited

U.S. PATENT DOCUMENTS

| | | | |
|---|---|---|---|
| 5,133,180 | 7/1992 | Horner et al. | 60/39.12 |
| 5,165,224 | 11/1992 | Spadaccini et al. | 60/39.02 |
| 5,704,206 | 1/1998 | Kaneko et al. | 60/39.12 |

*Primary Examiner*—Louis J. Casaregola
*Attorney, Agent, or Firm*—Ostrolenk, Faber, Gerb & Soffen, LLP

[57] ABSTRACT

A method for the combined production of synthesis gas and electrical power including at least a step for the production of synthesis gas by combusting a second fuel stream with combustion air to flue gas and passing the flue gas in heat conducting relationship with steam reforming reactions of a hydrocarbon feedstock in a heat exchange reactor, and a step for the production of electrical power by combusting a first fuel stream with combustion air in a gas turbine combustion chamber to a flue gas and expanding the flue gas in a gas turbine; wherein the flue gas from one of the steps is used as combustion air in the other step.

1 Claim, 2 Drawing Sheets

METHOD FOR COMBINED GENERATION OF SYNTHESIS GAS AND POWER

This Appln. claims the benefit of U.S. Provisional Appln. No. 60/020,238 filed Jun. 21, 1996.

The present invention is directed to combined production of synthesis gas and electrical power by incorporation of a gas turbine in the combustion air supply to a heat exchange reformer.

The invention provides in particular a method of generating power at a high efficiency by using hot exhaust from a gas turbine at near atmospheric or elevated pressure as combustion air to the heat supply in a heat exchange steam reformer (HER) for production of synthesis gas from a hydrocarbon feedstock.

Alternatively, by the process of the invention compressed air from the gas turbine air compressor may be employed as combustion air firstly in the HER and subsequently in a secondary combustion for raising flue gas temperature from the HER before the gas is expanded in a gas turbine expander.

HER is a conventionally available hydrocarbon reforming technology. The advantage of HER reformers is a high degree of convective heat transfer compared to heat transfer by radiation like in a reforming furnace. This is obtained by a significant combustion air excess, which limits the flue gas temperature.

Conventionally, the HER is fed with preheated desulphurized hydrocarbon stream mixed with steam.

The reforming process is performed in presence of a reforming catalyst arranged in the HER. The steam reforming process proceeds by below reactions:

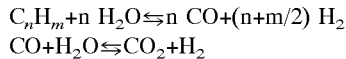

$C_nH_m + n\ H_2O \leftrightarrows n\ CO + (n+m/2)\ H_2$ $CO + H_2O \leftrightarrows CO_2 + H_2$ The concept of the HER implies that the endothermic reactions are conducted in such a manner that the effluent from the reformer catalyst bed by cooling provides part of the necessary heat for the reforming process. The remainder of the required reformer duty is supplied by burning fuel in the HER combustion chamber and producing a hot flue gas stream, which is passed at the outside of the catalyst bed walls in heat conducting relationship with the above steam reforming reactions in the bed at near atmospheric or elevated pressure.

The combustion is carried out with excess of air for the attainment of a proper flue gas temperature to obtain predominantly convective heat transfer to the catalyst through the catalyst bed walls.

Synthesis gas produced in the HER is applicable for several syntheses e.g. methanol or for the production of hydrogen or carbon monoxide by means of downstream process sections.

In the conventional layout, the HER is supplied with combustion air in excess of a combustion air compressor. The necessary power for such and other miscellaneous equipment (i.e. compressors, blowers, pumps etc.) in a HER based plant will usually be supplied by power import or onsite generation of power typically by steam turbines or gas turbines.

A gas turbine requires, analogous to the HER, significant excess of combustion air in order to control the flue gas temperature.

Based on the fact that both a HER reformer and a gas turbine require control of flue gas temperature, we found that improved process efficiency is achieved when oxygen depleted exhaust from HER is used as combustion air in the gas turbine and vice versa. The entire calorific energy of exhaust gas from the first process down to ambient temperature is transformed into combustion air preheating duty in the subsequent combustion process without loss of entropy.

Accordingly, the present invention is a method for the combined production of synthesis gas and electrical power including at least a step for the production of synthesis gas by combusting a secondary fuel stream with combustion air to flue gas and passing the flue gas in heat conducting relationship with steam reforming reactions of a hydrocarbon feedstock in a heat exchange reactor, and a step for the production of electrical power by combusting a primary fuel stream with combustion air in a gas turbine combustion chamber to a flue gas and expanding the flue gas in a gas turbine;

wherein the flue gas from one of the steps is used as combustion air in the other step.

By the inventive method, power is produced at high efficiency in a gas turbine in combination with a heat exchange reformer. The fuel amount required for the co-production of power and synthesis gas is converted with an efficiency of about 80–90%, which is not achievable by a separate power generation.

As another advantage, sequential use of combustion air requires only one common flue gas waste heat recovery section instead of two separate recovery sections, whereby the overall flow of flue gas is considerably reduced.

By the process of the invention, combustion air for use in the HER is passed to a gas turbine burning a liquid or gaseous fuel stream, producing power and a hot oxygen containing exhaust gas;

the oxygen containing exhaust gas is then passed to the HER combustion chamber, where it is used for burning of additional fuel supplying an appropriate flue gas stream as heating medium in the reformer and the common waste heat recovery section, alternatively the combustion air is passed to a gas turbine compressor, where it is compressed and sent to the HER combustion chamber, for use in burning of a liquid or gaseous fuel stream, supplying an appropriate flue gas stream as heating medium in the reformer;

the oxygen containing effluent from the HER is then used for burning of an additional fuel stream producing exhaust gas, which is passed to the gas turbine expander and finally through the common waste heat recovery section.

In operating the method of the invention as shown for a specific embodiment in FIG. 1, ambient air 2 is passed to a gas turbine (GT) compressor and compressed in the gas turbine air compressor in one or more stages. Compressed air is then mixed and reacted as an oxygen source in excess of a liquid or gaseous fuel stream 11 in the gas turbine combustion chamber.

Flue gas 8 from the combustion chamber contains substantial residual amounts of oxygen and is subsequently passed to the gas turbine expander (GT Expander), in which the flue gas is depressurized to near atmospheric or elevated pressure, as appropriate for the HER combustion air.

Oxygen containing flue gas stream 12 is passed to the HER and once more reacted as oxygen source in excess with liquid or gaseous fuel 6 in HER combustion chamber 9, providing a second flue gas stream at a sufficiently high temperature (typically 1300° C.) and a high flow rate to supply heat for the heat requiring endothermic reforming process taking place in catalyst chamber 14 of the HER.

Flue gas 10 from the HER being cooled on flue gas side in the heat absorbing HER reforming section 14 is further cooled in a common flue gas waste heat recovery section (WHS).

The gas turbine produces shaft power, which is optionally used for driving a turbo generator or e.g. a compressor (not shown).

Figure 2:
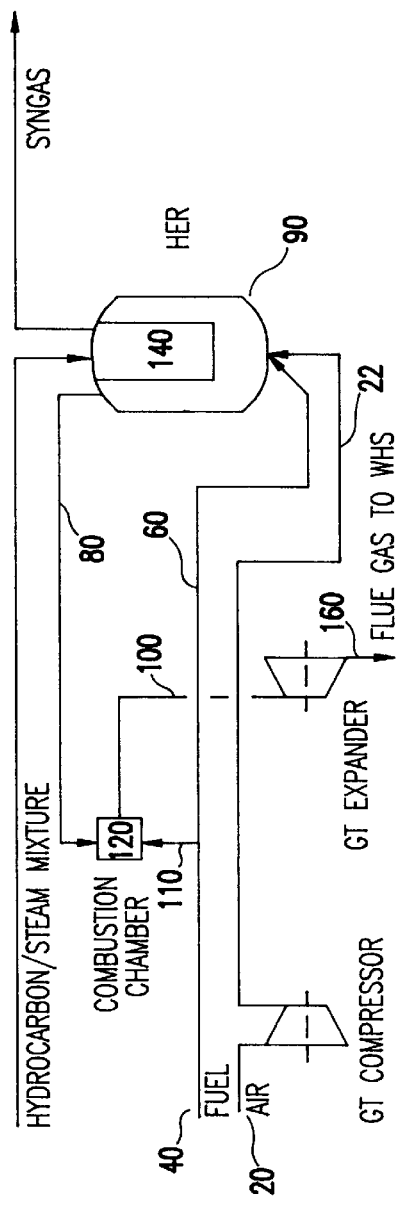

In a further embodiment of the invention as shown in FIG. 2, ambient air 20 is passed to the gas turbine air compressor (GT Compressor) and compressed in one or more stages.

Compressed air 22 is passed to HER combustion chamber 90 and mixed and reacted as oxygen source in excess of a liquid or gaseous fuel stream 60, providing a flue gas at a sufficiently high temperature (typically 1300° C.) and a high flow rate to supply heat for the heat absorbing endothermic reforming process taking place in the HER reforming section 140.

Flue gas 80 being cooled on the flue gas side in the heat absorbing HER reforming section 140; and HER containing residual amounts of oxygen is then passed on to combustion chamber 120 and once more reacted as oxygen source in excess of liquid or gaseous fuel 110 producing flue gas 100.

Flue gas 100 is passed to the gas turbine expander, and depressurized in the turbine closed to atmospheric pressure.

Depressurized flue gas stream 160 is then sent through a common waste heat recovery section (WHS).

The gas turbine is producing shaft power, which is optionally used for driving a turbo generator or e.g. a compressor (not shown).

In both embodiments shown in FIGS. 1 and 2 compressed combustion air from the air compressor may be bypassed directly to the secondary combustion chamber.

Conditions employed and results obtained in the embodiments shown in FIG. 1 and FIG. 2 are summarized in Table 1 and Table 2, respectively.

Figure 3:
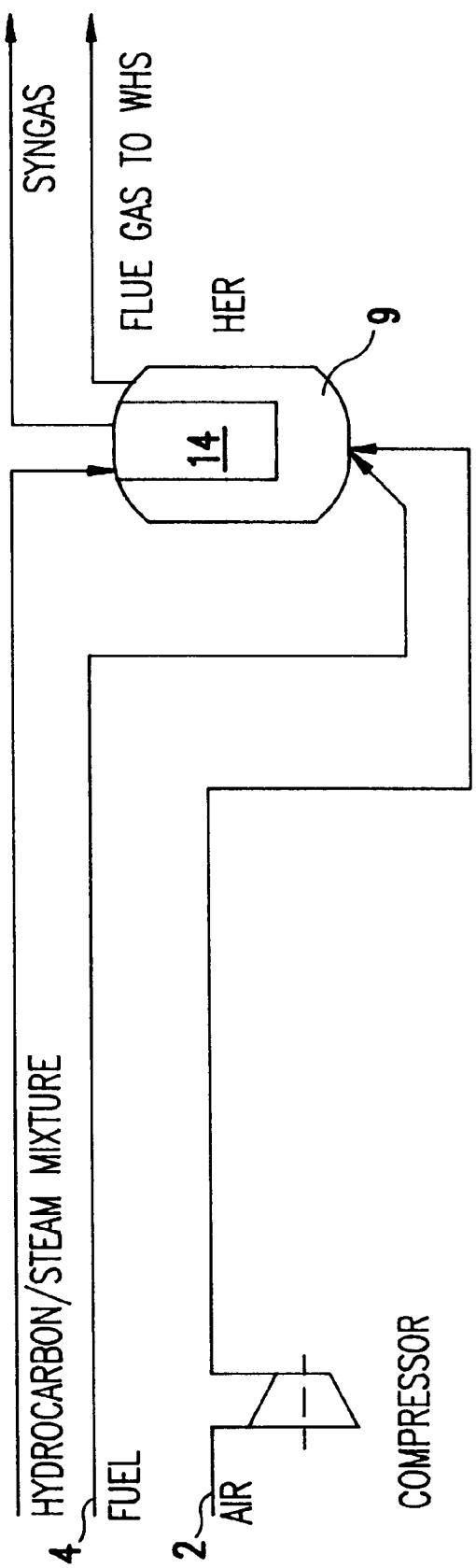

Compared to conventionally synthesis gas production in a HER without a gas turbine as shown in FIG. 3 and summarized in Table 3, considerable energy saving is obtained by the inventive method. Whereas a conventional HER as shown in FIG. 3, requires power import of 8.9 MWh/h, excess of power is produced by combined production of power and synthesis gas. By the embodiment of FIG. 1, 29 g MWh/h power are exported from the plant. The conversion efficiency of additional fuel required in the combined production of synthesis gas and power is, thereby, 89% as apparent from Table 1. The embodiment shown in FIG. 2 allows power export of 76 MWh/h at a conversion efficiency of additional fuel of 94% (cf. Table 2).

TABLE 1

| Position in FIG. 1 | 2 | 4 | 6 | 8 | 10 |
|---|---|---|---|---|---|
| P [kg/cm$^2$ g] | 0 | 20 | 20 | 15 | 0 |
| T [° C.] | 15 | 25 | 25 | 1000 | 619 |
| Flow [Nm$^3$/h] | 538967 | 31181 | 19769 | 551661 | 573652 |
| LHV [kcl/Nm$^3$] | | 9856 | 9856 | | |
| Composition (vol %) | | | | | |
| N$_2$ | 76.92 | 0.48 | 0.48 | 75.16 | 72.3 |
| CO$_2$ | 0.03 | 1.56 | 1.56 | 2.55 | 6.65 |
| O$_2$ | 20.69 | | | 15.47 | 6.97 |
| Ar | 0.93 | | | 0.91 | 0.87 |
| H$_2$O | 1.43 | 0.14 | 0.14 | 5.91 | 13.21 |

TABLE 1-continued

| Position in FIG. 1 | 2 | 4 | 6 | 8 | 10 |
|---|---|---|---|---|---|
| Hydrocarbon | 97.82 | 97.82 | | | |

Power Export [Mwh/h] = 29.9

TABLE 2

| Position in FIG. 2 | 20 | 40 | 60 | 80 | 100 |
|---|---|---|---|---|---|
| P [kg/cm$^2$ g] | 0 | 20 | 20 | 14.7 | 14.6 |
| T [° C.] | 15 | 25 | 25 | 559 | 1270 |
| Flow [Nm$^3$/h] | 523687 | 35249 | 18339 | 544086 | 562896 |
| LHV [kcl/Nm$^3$] | | 9856 | 9856 | | |
| Composition: | | | | | |
| N$_2$ | 76.92 | 0.48 | 0.48 | 74.05 | 71.59 |
| CO$_2$ | 0.03 | 1.56 | 1.56 | 4.14 | 7.66 |
| O$_2$ | 20.69 | | | 12.18 | 4.89 |
| Ar | 0.93 | | | 0.89 | 0.86 |
| H$_2$O | 1.43 | 0.14 | 0.14 | 8.74 | 15 |
| Hydrocarbon | 97.82 | 97.82 | | | |

Power Export [MWh/h] = 76
Conversion efficiency of additional fuel [%] = 94

TABLE 3

| Position in FIG. 3 | 2 | 4 | 6 | 8 | 10 |
|---|---|---|---|---|---|
| P [kg/cm$^2$ g] | 0 | 20 | | 0 | |
| T [° C.] | 15 | 25 | | 619 | |
| Flow [Nm$^3$/h] | 548604 | 27380 | | 579060 | |
| LHV [kcl/Nm$^3$] | | 9856 | | | |
| Composition: | | | | | |
| N$_2$ | 76.92 | 0.48 | | 72.9 | |
| CO$_2$ | 0.03 | 1.56 | | 5.79 | |
| O$_2$ | 20.69 | | | 8.76 | |
| Ar | 0.93 | | | 0.88 | |
| H$_2$O | 1.43 | 0.14 | | 11.67 | |
| Hydrocarbon | | 97.82 | | | |

Power Import [MWh/h] = 8.9

We claim:

1. A method for the combined production of synthesis gas and electrical power including at least a steam reforming step for the production of synthesis gas by combusting a secondary fuel stream with an oxygen containing gas to flue gas and passing the flue gas in heat conducting relationship with steam reforming reactions of a hydrocarbon feedstock in a heat exchange reactor, and a step for the production of electrical power by combusting a primary fuel stream with an oxygen containing gas in a gas turbine combustion chamber to a flue gas and expanding the flue gas in a gas turbine;

wherein the flue gas from the steam reforming step is used as the oxygen containing gas in the step for the production of electrical power.

\* \* \* \* \*